US009541652B2

(12) United States Patent
DeWeese et al.

(10) Patent No.: US 9,541,652 B2
(45) Date of Patent: Jan. 10, 2017

(54) ACCURATE MOBILE CONTEXT DETECTION AT LOW SENSOR COST (71) Applicant: ARO, Inc., Seattle, WA (US)

(72) Inventors: Brian DeWeese, Seattle, WA (US); Erin Mounts, Seattle, WA (US); Ian G. Clifton, Issaquah, WA (US); Oliver Crandall Johnson, Seattle, WA (US); Kevin Francis Eustice, Seattle, WA (US); Michael Perkowitz, Seattle, WA (US)

(73) Assignee: ARO, Inc., Seattle, WA (US)

( * ) Notice: Subject to any disclaimer, the term of this patent is extended or adjusted under 35 U.S.C. 154(b) by 16 days.

(21) Appl. No.: 14/559,366

(22) Filed: Dec. 3, 2014

(65) Prior Publication Data
US 2015/0160015 A1 Jun. 11, 2015

Related U.S. Application Data (60) Provisional application No. 61/913,090, filed on Dec. 6, 2013.

(51) Int. Cl.
G01S 19/48 (2010.01)
G01S 19/46 (2010.01)
G01S 19/47 (2010.01)
G01C 21/20 (2006.01)
G01C 21/00 (2006.01)
H04W 4/04 (2009.01)

(52) U.S. Cl.
CPC .............. G01S 19/48 (2013.01); G01C 21/20 (2013.01); H04W 4/043 (2013.01)

(58) Field of Classification Search
None
See application file for complete search history.

(56) References Cited

U.S. PATENT DOCUMENTS 6,542,824 B1 *  4/2003  Berstis .................. H04N 5/232
                                                   701/472
7,421,155 B2    9/2008  King et al.
9,161,175 B1 * 10/2015  Smith .................... G01S 19/48
(Continued)

OTHER PUBLICATIONS

United States Office Action, U.S. Appl. No. 13/950,169, filed Jun. 12, 2014, eight pages.
(Continued)

Primary Examiner — Yonel Beaulieu
Assistant Examiner — Krishnan Ramesh
(74) Attorney, Agent, or Firm — Fenwick & West LLP (57) ABSTRACT A mobile device includes a plurality of sensors, each with one or more costs associated with it. In order to reduce the cost associated with using the sensors to infer information about the device's current context, a sensor manager first collects readings from relatively low-cost sensors, and attempts to infer the device's context based on these readings. If the context cannot be unambiguously determined (within an acceptable degree of tolerance) using the low-cost sensor readings, the sensor manager activates one or more higher-cost sensors to identify the current context. In some instances, if the higher-cost sensor is still not adequate to determine the context, one or more even higher-cost sensors are activated. The weighting of the various costs associated with the sensors can be adjusted based on previous and/or predicted contexts.

17 Claims, 3 Drawing Sheets

(56) References Cited

U.S. PATENT DOCUMENTS

| | | | |
|---|---|---|---|
| 2004/0192352 A1* | 9/2004 | Vallstrom | G01S 5/0027 455/456.6 |
| 2006/0029296 A1 | 2/2006 | King et al. | |
| 2006/0041828 A1 | 2/2006 | King et al. | |
| 2006/0050996 A1 | 3/2006 | King et al. | |
| 2006/0053097 A1 | 3/2006 | King et al. | |
| 2006/0217990 A1 | 9/2006 | Theimer et al. | |
| 2007/0006098 A1 | 1/2007 | Krumm et al. | |
| 2009/0005987 A1* | 1/2009 | Vengroff | G06Q 30/02 701/300 |
| 2010/0127836 A1* | 5/2010 | Huang | G01C 22/006 340/10.5 |
| 2010/0127926 A1* | 5/2010 | Wang | G01S 19/34 342/357.74 |
| 2011/0082642 A1* | 4/2011 | Magnussen | G01C 21/30 701/532 |
| 2011/0300875 A1* | 12/2011 | Kim | G01S 19/16 455/456.1 |
| 2012/0268249 A1* | 10/2012 | Kansal | G01C 21/20 340/8.1 |
| 2012/0316774 A1* | 12/2012 | Yariv | G01C 21/3685 701/423 |
| 2013/0124081 A1* | 5/2013 | Khosravy | G01S 5/0263 701/408 |
| 2014/0019247 A1* | 1/2014 | Melanson | H04M 1/72572 705/14.58 |
| 2014/0032208 A1 | 1/2014 | Liu et al. | |
| 2014/0032358 A1 | 1/2014 | Perkowitz et al. | |
| 2014/0032453 A1 | 1/2014 | Eustice et al. | |
| 2014/0032572 A1 | 1/2014 | Eustice et al. | |
| 2014/0213299 A1* | 7/2014 | Marti | G06F 3/048 455/456.3 |
| 2014/0244156 A1* | 8/2014 | Magnusson | G01C 21/34 701/418 |
| 2014/0278054 A1* | 9/2014 | Tidd | G01C 21/00 701/409 |
| 2015/0127239 A1* | 5/2015 | Breed | B60R 21/0132 701/70 |
| 2015/0330793 A1* | 11/2015 | Zalewski | G01C 21/165 701/523 |
| 2016/0192154 A1* | 6/2016 | Modica | G01S 5/10 455/456.1 |

OTHER PUBLICATIONS

United States Office Action, U.S. Appl. No. 13/950,169, filed Feb. 27, 2014, eight pages.

* cited by examiner

ACCURATE MOBILE CONTEXT DETECTION AT LOW SENSOR COST

CROSS-REFERENCE TO RELATED APPLICATION

This application claims the benefit of U.S. Provisional Application No. 61/913,090, filed Dec. 6, 2013, which is hereby incorporated by reference in its entirety.

BACKGROUND

1. Technical Field

The described embodiments pertain to managing sensor usage by a mobile device, and in particular to selecting when to use particular sensors to reduce associated costs.

2. Description of Related Art

A variety of applications and systems currently exist that use location data collected from a mobile device to provide location-aware functionality. Location-awareness is useful for a wide range of systems. Location-aware systems typically identify the user's current geo-spatial location using a location-determination sensor and compare this location to a database to predict a venue or area that the user is currently at or near. For example, a weather application can provide pertinent information about the city the user is currently in, a navigation system can offer to provide directions to near-by venues that the user has previously visited, a marketing system can provide advertisements for venues similar to those the user frequents, and the like.

Many modern mobile devices such as smartphones and tablets include a large number of sensors capable of collecting a wide array of data of varying types. A typical smartphone includes a GPS positioning sensor, a microphone, a camera, and an accelerometer. Each of these sensors has various costs associated with using it, such as battery usage, processing time, data storage, bandwidth, and user annoyance/disruption. These costs can reduce the usefulness of applications that make use of such sensors. In existing systems, such costs can be alleviated by turning off sensors, but this reduces the amount of data available to applications, which reduces their value and can even render them inoperative.

SUMMARY

The above and other problems are solved by a method, non-transitory computer readable storage medium, and system that use previously gathered information to efficiently select which physical sensors to activate and when to do so. Thus, the system provides applications with accurate, up-to-date information while mitigating costs associated with operating physical sensors.

In one embodiment, a mobile device includes at least one low-cost sensor and at least one high-cost sensor (relative to the low-cost sensor). Sensor readings are obtained from the low-cost sensor and compared to sensor fingerprints of known venues. If the current venue at which the mobile device is located can be identified based on the low-cost sensor reading, the high-cost sensor need not be activated. However, if the low-cost sensor reading is inadequate to identify the current venue, a high-cost sensor reading is obtained from a high-cost sensor. Thus, the high-cost sensor is activated if the low-cost sensor reading is inadequate to provide a dynamic balance between precision and cost.

In another embodiment, a mobile device includes at least one low-cost sensor and at least one high-cost sensor (relative to the low-cost sensor), where the high-cost sensor provides an accurate estimate of the user's current context and the low-cost sensor provides an accurate indicator of change and/or uncertainty in the user's current context. For example, the low cost sensors might indicate when the user is moving and trigger a high-cost location sensor in order to determine at what venue the mobile device is present. Thus, the high-cost sensor is used less than if the readings from the low-cost sensors are not used, so the overall cost of determining the device's location is reduced.

In further embodiments, sensors of other relative costs (e.g., a medium-cost sensor) are also available to the mobile device. In general, the mobile device collects readings from a low-cost sensor, and if these readings are inadequate to determine the venue at which the mobile device is present, the mobile device collects additional readings from a next lowest-cost sensor having a higher cost than the low-cost sensor (e.g., a medium-cost sensor). If the additional readings are also inadequate to accurately determine the venue at which the mobile device is present, then the mobile device collects readings from a next lowest-cost sensor (e.g., a high-cost sensor), and so on, until the collected readings are adequate to accurately determine the venue at which the mobile device is present, or until the available sensors have been used.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Embodiments of the invention compare sensor readings from one or more sensors to determine which sensors to activate and how often to activate them. In one embodiment, a sensor reading from one or more low-cost sensors is compared to stored sensor fingerprints to determine whether activation of a high-cost sensor is required to identify the location at which a mobile device is present. A user's typical routine may also be used to determine whether to activate particular sensors.

System Overview

Figure 1:
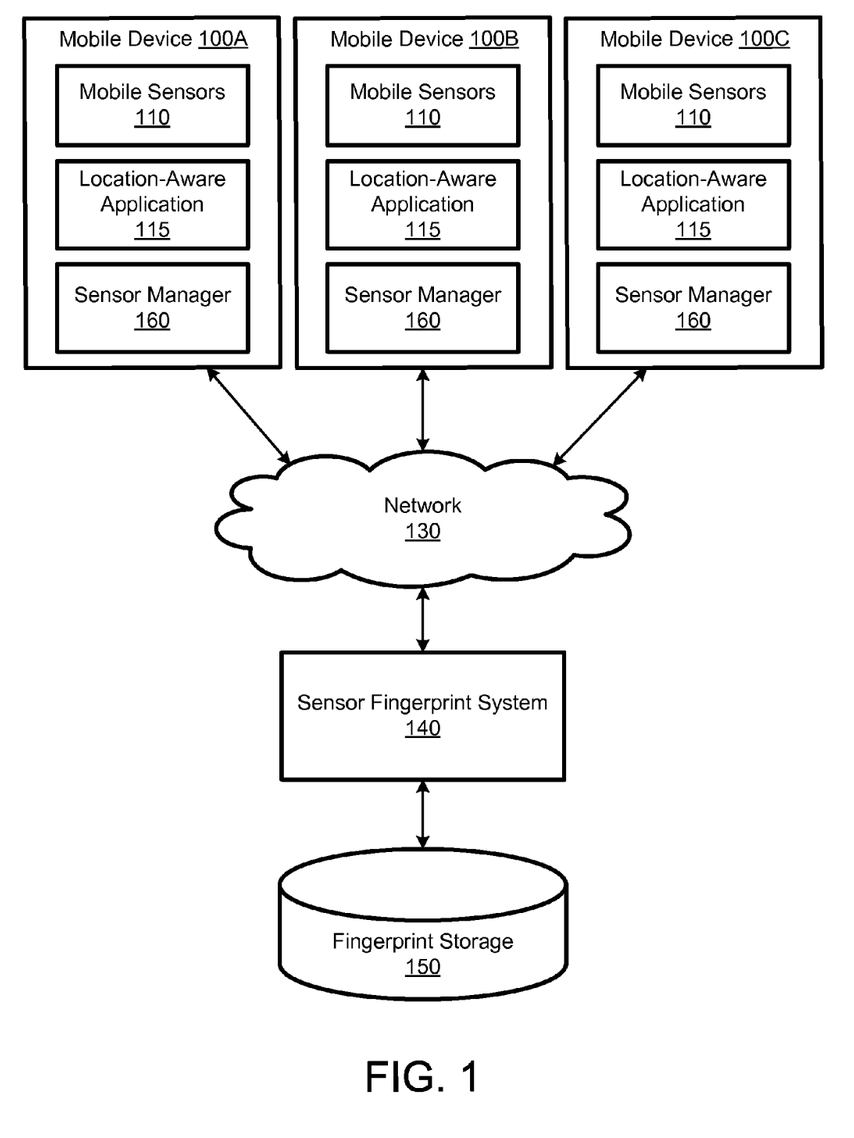
FIG. 1 is a high-level block diagram illustrating a system environment that uses sensor fingerprints to determine whether to activate a high-cost sensor, according to one embodiment.

FIG. 1 illustrates a system environment that uses sensor fingerprints to assist in the identification of a venue, according to one embodiment. The system environment includes one or more mobile devices 100 (of which three are shown for illustrative purposes) connected to a sensor fingerprint system 140 via a network 130, and fingerprint database 150. In one embodiment, the sensor fingerprint system 140 and the fingerprint database 150 are contained on a single processing node, such as a server operated by a sensor fingerprinting service provider. In other embodiments, these entities may be provided individually at each of the mobile devices 100 or divided between the mobile devices and a centralized processing node. An example distributed embodiment is one where the sensor fingerprint system 140 is located on the mobile devices 100 and sensor fingerprints are stored in a centralized fingerprint database 150 to enable efficient sharing of fingerprints between mobile devices.

The mobile devices 100 are electronic devices that users will typically carry on their person, such as smartphones, tablets, PDAs, laptops, and the like. Three mobile devices 100A, 100B, and 100C are shown in FIG. 1 as an example only. In actual systems, many (e.g., thousands, or even millions of) mobile devices 100 may be connected to the sensor fingerprint system 140, via network 130. In the embodiment shown in FIG. 1, each mobile device 100 includes one or more mobile sensors 110 and at least one location-aware application 115. The location-aware application 115 provides functionality to the user based on the venue at which the user is located, such as a contextual information provider app running on a smartphone. The mobile sensors 110 are components of the mobile device 100 capable of taking measurements of a variable relating to the mobile device. The mobile sensors 110 include sensors to produce location data and physical sensors that quantify physical properties of the environment around the mobile device 100. The measurements taken by physical sensors for the purpose of venue fingerprinting are collectively referred to herein as sensor readings. The mobile sensors 110 provided in one embodiment are described in greater detail below, with reference to FIG. 2. The sensor manager 160 determines which of the sensors 110 to activate at any given time. Embodiments of the sensor manager 160 are described in greater detail below, with reference to FIG. 4.

In the embodiment shown in FIG. 1, the mobile devices 100 are connected to a sensor fingerprint system 140 via a network 130. The network 130 is typically the Internet, but can be any network, including but not limited to any combination of a LAN (local-area network), a WAN (wide-area network), a mobile, a wired or wireless network, a private network, or a virtual private network.

The sensor fingerprint system 140 processes sensor fingerprint data collected by the mobile sensors 110 of one or more mobile devices 100 to produce sensor fingerprints to assist in the identification of a venue at which a user is located. A sensor fingerprint (or "fingerprint") comprises a set of sensor readings from one or more of a mobile device's physical sensors (e.g., a microphone, a camera, a thermometer) that quantify physical properties of the environment around the mobile device. These sensor readings may be used to identify a particular set of circumstances around the mobile device 100, such as the mobile device 100 being located at a particular venue or category of venue, the mobile device 100 being carried by an individual undertaking a particular activity, or the mobile device 100 being located at a particular type of event (e.g., a rock concert, a sports event). The sensor readings collected by the physical sensors may be aggregated to generate fingerprints with varying degrees of specificity. For example, the fingerprints may include a fingerprint that generically describes bars, a fingerprint that generically describes karaoke, and a fingerprint that describes a particular bar on karaoke night. The functionality attributed to the sensor fingerprint system 140 herein may be provided locally at the mobile devices 100, by a remote computing device (as shown in FIG. 1), or distributed between the two. Various embodiments of the sensor fingerprint system 140 are described below, with reference to FIG. 3.

The fingerprint database 150 comprises one or more computer-readable storage media and receives the fingerprints formed by the sensor fingerprint system 140 for storage. The fingerprints are stored in association with an identifier of the corresponding venue and/or venue category. Thus, over time the fingerprint database 150 generates and updates a collection of sensor fingerprints describing multiple venues and venue categories. These sensor fingerprints may be generated based on an aggregate or summary of multiple readings from a single user or from multiple users over time. The sensor fingerprint system 140 can then access the stored fingerprints in order to assist in the identification of the venue at which a mobile device 100 is currently located. In one embodiment, the fingerprint database 150 is part of computer that also includes the sensor fingerprint system 140 (e.g., a server that provides sensor fingerprinting services to mobile devices 100). In another embodiment, such as when the sensor fingerprint system 140 functionality is provided locally at each mobile device 100, the fingerprint database 150 is provided by one or more computing devices that are accessed via the network 130 (e.g., as part of a server farm). In yet another embodiment, the fingerprint database 150 is provided at the mobile devices 100 individually. For example, a mobile device considers sensor readings from its own sensors, thereby providing sensor fingerprinting functionality without network connectivity.

Example Sensors

Figure 2:
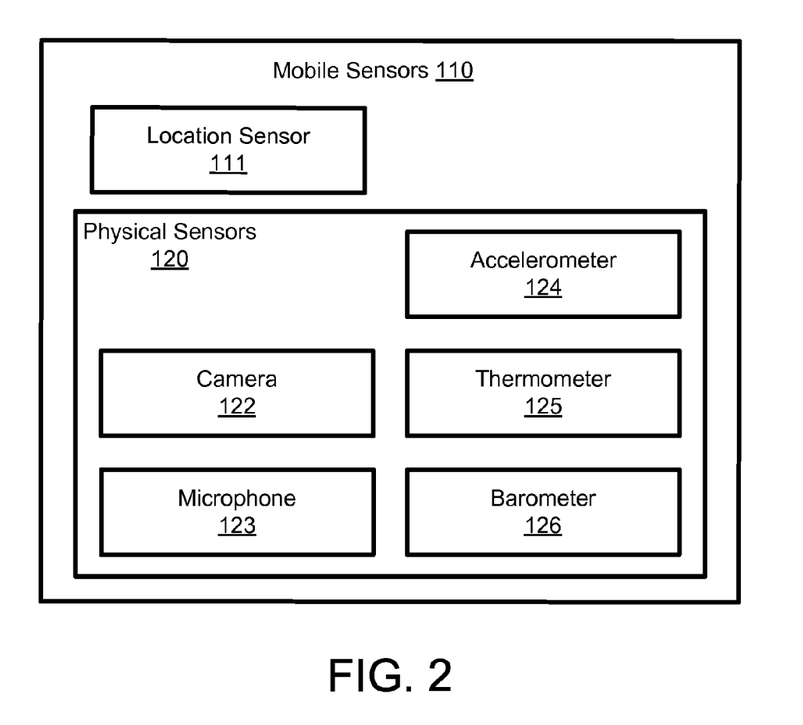
FIG. 2 is a high-level block diagram illustrating the mobile sensors of one of the mobile devices shown in FIG. 1, according to one embodiment.

FIG. 2 illustrates the mobile sensors 110 included in one embodiment of a mobile device 100. In the embodiment shown, the mobile sensors 110 include a location sensor 111 and physical sensors 120 including a camera 122, a microphone 123, an accelerometer 124, a thermometer 125, and a barometer 126. In other embodiments, different and/or additional mobile sensors 110 are included a part of the mobile device 100.

Each of the mobile sensors 110 has various costs associated with using it, such as battery usage, processing time, data storage, bandwidth, and/or user annoyance/disruption. The description herein focuses on embodiments in which the sensors are grouped into low-cost sensors and high-cost sensors. However, in other embodiments, sensors may be grouped into three or more sets (e.g., low-cost sensors, medium-cost sensors, and high-cost sensors) based on the associated costs, up to and including ranking all available sensors by cost, such that each set contains a single sensor. Further, each cost associated with a sensor can be viewed as a cost dimension with a range from zero cost to infinite cost, with any given sensor having costs located somewhere in a dimensional space spanned by the various cost dimensions. Depending on the specific context of the user, and the demands of the particular application, whether a sensor is considered a low-cost sensor or a high-cost sensor is determined based on the sensor's position in one or more cost dimensions.

For example, a location sensor 111 such as a GPS sensor has a high power cost, but little to no user disruption cost; in contrast, an acoustic analysis of the current venue performed using a speaker and microphone 113 has a low power cost but a high user disruption cost. If the user is leaving home to catch a flight, the power cost is highly significant, and so the mobile device 100 may elect to minimize use of the GPS sensor 111, at the expense of increased user disruption through the acoustic analysis using the speaker and microphone 113. If the user is at home listening to music with the mobile device 100 plugged into a charger, the high battery-usage cost of the GPS sensor 111 is of little importance, whereas the disruption of having the speaker emit regular chirps for acoustic analysis is significant. Therefore, in this scenario, the mobile device 100 may elect to use the GPS sensor 111 to avoid the use of sensors that have a higher user-disruption cost.

As another example, the device 100 may take an acoustic sample using the microphone 113 and either process it minimally to produce a simple fingerprint (e.g., a decibel level reading) or process it more extensively to produce a more complex fingerprint (such as an analysis of the energy levels in multiple frequency bands). The latter provides more accurate information, but at the cost of significant CPU usage. If the user is in the middle of a high CPU-usage activity, such as playing a game, the system may choose to forgo the additional processing in order to avoid disrupting the user's activity.

The location sensor 111 determines the geo-spatial location of the mobile device 100 using one or more techniques, including GPS tracking, WiFi location, cell-tower triangulation, and the like.

The camera 122 collects images (and/or video), which may be analyzed to determine environmental data such as an average light intensity level and/or an average spectral profile of the images. In one embodiment, a light of the mobile device 100 emits light with known properties at the time the camera 122 collects sensor readings. For example, the light may emit one or more known colors of light with preset intensities such that the image taken by the camera identifies the response of the environment to that color and intensity of light (e.g., red walls will not reflect blue light, but will reflect red light).

The microphone 123 collects audio data, which may be analyzed to determine environmental data such as an average sound intensity level and/or an average frequency profile of the audio data. In one embodiment, a speaker of the mobile device 100 emits a sound with known properties (e.g., a chirp with a predetermined frequency profile, volume, and length) at the time the microphone 123 collects sensor readings. Thus, the microphone 123 data can be used to determine features of the mobile device's environment, for example by using echo location techniques and/or examining the frequency profile of the space (e.g., an echo of the emitted sound from a concrete wall will be very different from the frequency profile of an echo of the same sound from a curtain).

The accelerometer 124 collects data regarding changes in velocity of the mobile device 100, which can be analyzed to determine additional data, such as what activity the user is performing (e.g., standing still, walking, running, dancing). Similarly, gyroscopes may provide further data indicative of a user's activities.

The thermometer 125 measures the temperature of the immediate surroundings of the mobile device 100. Different venues have different characteristic temperatures due to different climate control settings and exposure to the outdoors. Additionally, variability in temperature data may differentiate different venues. For example, a rooftop patio experiences a greater range of temperatures than a basement location. Some venues may have temporal patterns associated with temperature data. For example, a room with west-facing windows experiences an increase in temperature in the late afternoon while a room with east-facing windows experiences an increase in temperature in the morning.

The barometer 126 measures air pressure around the mobile device. Absolute pressure sensed by the barometer 126 may indicate an elevation of a venue, which can be used to distinguish between venues on different floors of a building. Even when the barometer 126 is not calibrated to provide precise elevation data, analysis of changes in barometric pressure over relatively short time spans may indicate when the barometer 126 (and hence the mobile device 100) are raised or lowered by one or more floors.

Sensor Fingerprint System

Figure 3:
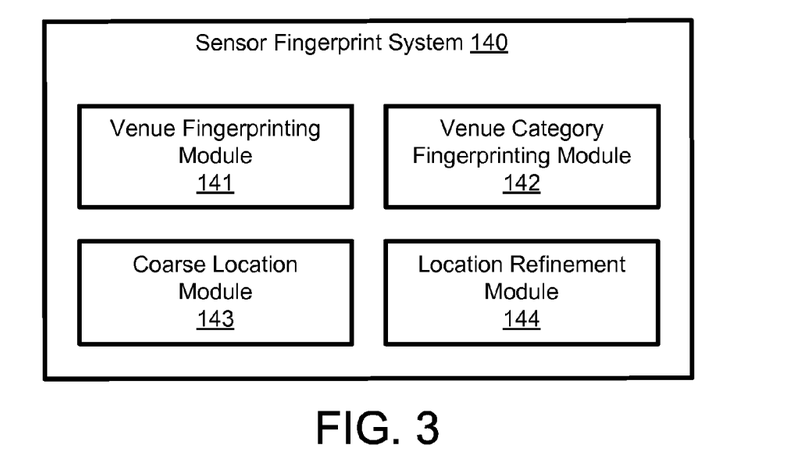
FIG. 3 is a high-level block diagram illustrating the sensor fingerprint system shown in FIG. 1, according to one embodiment.

FIG. 3 illustrates one embodiment of the sensor fingerprint system 140 shown in FIG. 1. In the illustrated embodiment, the sensor fingerprint system 140 includes a venue fingerprinting module 141, a venue category fingerprinting module 142, a coarse location module 143, and a location refinement module 144. In other embodiments, the sensor fingerprint system 140 contains different and/or additional elements. In addition, the functions may be distributed among the elements in a different manner than described herein.

The venue fingerprinting module 141 receives sensor readings from one or more mobile devices 100 that are known to have been located within a particular venue (e.g., the corresponding users checked in or confirmed their presence at the venue) at the time the sensor reading was collected. The venue fingerprinting module 141 processes the sensor readings to produce a venue fingerprint that identifies typical sensor readings for the venue for one or more sensor reading types. In various embodiments, a sensor fingerprint includes information describing measures of sensor reading variability (e.g., standard deviation, range). The sensor fingerprint may include time-specific typical sensor readings (and measures of variability) or device-specific typical sensor readings (and measures of variability). For example, the frequency profile of a sound sample collected at a bar on a Tuesday afternoon is likely to be significantly different from a sound sample collected in the same bar on a Saturday night during karaoke. As another example, the frequency response of a microphone 123 varies depending on the manufacturer of the mobile device 100 and/or microphone 123. Thus, the frequency profile obtained by recording the same sound with each device will be different.

In one embodiment, variations between devices are tested in controlled conditions and a filter is applied to sensor readings to correct for the differences. For example, by recording samples of white noise using a mobile device 100, the exact frequency response of the microphone 123 of that device can be determined, and a filter applied to samples recorded in future to provide an estimate of the true frequency profile of the sound received at the device. In this way, recordings can be normalized across devices.

In other embodiments, these known variations can be accounted for either by including multiple sets of values within a fingerprint with an indication of what conditions (e.g., time, device) each corresponds to, by having a different fingerprint for each variation, with the fingerprint that is used being selected based on the relevant conditions, or by having a time-specific sensor fingerprint generated from fingerprint readings collected during a recurring time period. For example, if the current time is a Wednesday afternoon, a "weekday: daytime" fingerprint might be used, whereas on a Friday night, a "weekend: night" fingerprint might be used.

The venue category fingerprinting module 142 receives sensor readings from one or more mobile devices 100 that are known to have been located within a venue of a particular category (e.g., coffee shops, libraries, sports stadiums) at the time the sensor readings were collected. These sensor readings may also be used by the venue fingerprinting module 141 to generate fingerprints for the individual venues within the categories, depending on the specific embodiment. The venue category fingerprinting module 142 processes the sensor readings to generate a category venue fingerprint, which is an aggregate fingerprint for the venue category that identifies typical sensor readings obtained by one or more sensor types in venues of that category. As with fingerprints for specific venues, venue category fingerprints can account for known differences, such as temporal variations and device-specific variations.

The coarse location module 143 receives data from one or more location sensors 111 of a mobile device 100 and determines a geo-spatial location of the mobile device. Typically the geo-location will have a degree of precision, based on the accuracy of the location sensors 111 used to determine it. The coarse location module 143 may determine the geo-spatial location based on a single sensor reading, or aggregate multiple sensor readings (e.g., by finding an average of multiple GPS readings) to provide an estimate of the mobile device's location. In one embodiment, the coarse location module 143 compares the determined geo-spatial location to a venues database (not shown) to identify one or more venues at which the mobile device 100 may be located.

The location refinement module 144 uses sensor fingerprints to refine the location for a mobile device 100 from the coarse location determined by the coarse location module 143. The location refinement module 144 compares readings from the physical sensors 120 to fingerprints in the fingerprint database 150 to determine a venue and/or venue category at which the mobile device 100 is likely to be located. The location refinement module 140 may also determine additional information about the venue from the fingerprints, such as what activity the user is participating in (e.g., watching or participating in a sporting event), whether the venue is open (e.g., whether the user is a bartender setting up before opening, or a patron who is drinking), and the like. The location refinement module 140 may also use other relevant data about venues, such as hours of operation or the likelihood of this user or users in general being at that venue at the current time, in order to refine the estimated likelihood for each venue.

In one embodiment, the location refinement module 144 selects the single most likely venue in the device's vicinity based on the sensor fingerprints. In another embodiment, the location refinement module 144 filters candidate venues (e.g., all those within one hundred yards of the determined coarse location) to produce a list of candidate venues for further processing (e.g., for presentation to the user, who selects the correct venue from the list). In a further embodiment, a single venue is selected if one can be identified with greater than a threshold level of certainty, and the user is presented with a list of candidate venues (e.g., all those with at least a predetermined minimum level of certainty) to choose from if no single venue exceeds the threshold.

In some embodiments, the location refinement module 144 may be able to identify the current venue at which a mobile device 100 is located without receiving location data at all. For example, if a user enters a recording studio that has a distinctive fingerprint (e.g., lime green walls and a distinctive acoustic profile), then the readings obtained from the physical sensors 120 may be matched to the studio's fingerprint with a high enough degree of certainty that the location data need not be considered at all.

Sensor Manager

Figure 4:
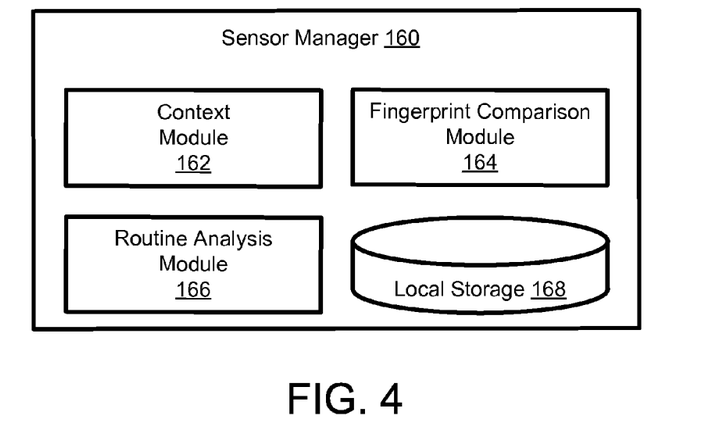
FIG. 4 is a high-level block diagram illustrating the sensor manager of one of the mobile devices shown in FIG. 1, according to one embodiment.

FIG. 4 illustrates one embodiment of the sensor manager 160 of a mobile device shown in FIG. 1. In the illustrated embodiment, the sensor manager 160 includes a context module 162, a fingerprint comparison module 164, a routine analysis module 166, and local storage 168. In other embodiments, the sensor manager 160 contains different and/or additional elements. For example, the routine analysis module 164 may be omitted in some embodiments. In addition, the functions may be distributed among the elements in a different manner than described herein.

The local storage 168 comprises one or more computer-readable storage media and stores data that is used by the sensor manager 160. In one embodiment, the local storage 168 stores sensor fingerprints for known venues. This enables the sensor manager 160 to compare sensor readings to the fingerprints of known venues without accessing the network 130, which can reduce battery power usage. If the sensor readings do not match any of the fingerprints of known venues in the local storage 168, then the sensor manager 160 can then connect to the sensor fingerprint system 140, via the network 130, and request a more detailed analysis (e.g., by comparing the sensor reading to fingerprints generated by other mobile devices 100).

The context module 162 assists in determining which of the sensors 110 to activate and how often to collect data with those sensors based on the current context of the mobile device 100. The context of a mobile device 100 can include any available information about the location of the device and the current activity of the corresponding user. A context can also include multiple levels of specificity. For example, the contextual information associated with a user's location may include specific GPS coordinates and a venue that corresponds to those coordinates, as well as the neighborhood, city, or country that the coordinates are located within. As another example, the contextual information associated with the user playing baseball may include that the activity is exercise, sport, and baseball. Other types of contextual information include, but are not limited to: the day of the week, the time of day, whether the user is indoors or outdoors, whether the user is stationary or in transit, and what type of transportation the user is using.

The context of a mobile device 100 is determined from recent data obtained from the sensors 110 and/or user input (e.g., if the user checks-in at a particular event, the user's current activity can be inferred). In one embodiment, the current context is used to determine the frequency with which a mobile device's GPS sensor 111 is activated. The GPS sensor 111 uses a large amount of battery power relative to other sensors 110. Thus, if the mobile device 100 is substantially stationary at an event, significant battery power savings can be realized by activating the GPS sensor 111 only occasionally (e.g., once an hour) or not at all. In contrast, if the mobile device 100 is observed to be travelling (e.g., if the user is driving) then the GPS sensor 111 may need to be activated regularly (e.g., once a minute) to ensure that the user's location is tracked with sufficient accuracy for the location-aware applications 115 to operate as intended.

In other embodiments, other aspects of the mobile device's context are used to determine whether and how often to activate other sensors. For example, if the user is listening to music (e.g., as determined from a social network status), there may be no value in activating the mobile device's microphone 113 as the music may conceal the location's usual audible fingerprint, and, if echolocation is used, the audible ping emitted by the device is likely to disrupt the user's enjoyment of the music (i.e., in this context, the microphone has a high convenience cost).

In one embodiment, the context module 162 uses data collected by low-cost sensors to determine when a change in context is likely to have occurred or is about to occur. If the readings taken by such a low-cost sensor (e.g., a microphone 113) indicate a sudden change, then it is likely that a change in context has just occurred, and the sensor manager 160 may activate one or more high-cost sensors (e.g., location sensor 111) to determine the device's new context. For example, if a user is sat in an office at work, the light level detected by the camera 112 is likely to remain fairly constant. However, if the user then walks outside to get lunch, the light level that is detected is likely to increase considerably. The sensor manager 160 identifies this increase in light level as corresponding to a change in context, and activates the location sensor 111 to determine the cause of the change in light level (that the user is now walking on the street). Once the user sits down at a restaurant to eat lunch, the location provided by the location sensor 111 becomes substantially constant, and the location sensor is deactivated until the low-cost sensors indicate another change in context.

The fingerprint comparison module 164 determines which of the sensors 110 to activate and how often by comparing recently collected sensor readings to known venue fingerprints. The fingerprint comparison module 164 may be able to identify the mobile device's location with acceptable precision without activating the location sensor 111 at all. For example, if a user enters a recording studio that has a distinctive fingerprint (e.g., lime green walls and a distinctive acoustic profile), then the readings obtained from the camera 112 and microphone 113 may be matched to the studio's fingerprint with a high enough degree of certainty that the location data need not be considered at all. Thus, the high cost of the location sensor 111 with regards to battery power usage need not be incurred.

The routine analysis module 166 determines which of the sensors 110 to activate and how often by considering the user's typical routine. In one embodiment, a user's routine model is stored in local storage 168 and describes a regular, predictable schedule of locations that the user visits and activities that the user participates in. For example, a user may generally be at work from nine until five during the week, at softball practice on Tuesday evenings from six until nine, at softball games on Friday evenings from six until ten, and at home the rest of the time (barring the associated travel, which may also be included in the routine model). Thus, the routine analysis module 166 can determine what readings to expect from low-cost sensors based on the user's routine model. If the low-cost sensor readings are consistent with the user's routine model (within a given tolerance threshold) then the routine analysis module 166 assumes that the user is following his or her usual routine and the high-cost sensor(s) need not be activated. However, if the low-cost sensor readings differ substantially from that which is expected (e.g., because the user skipped softball practice to go to a concert), then the high-cost sensors are activated to determine the user's location.

In any given scenario, the sensor manager 160 uses one or more of the context module 162, fingerprint comparison module 164, and routine analysis module 166, as well as data stored in the local storage 168 to balance the need for the location-aware application 115 to have accurate location information with the general goal of reducing the costs associated with the use of sensors 110. The precise balance achieved between accuracy and cost may depend on numerous factors, including what sensors 110 are available in a particular mobile device 100, the nature of the location-aware application 115, a user defined parameter, and/or a manufacturer/software provider's parameter.

Determination of Current Venue

Figure 5:
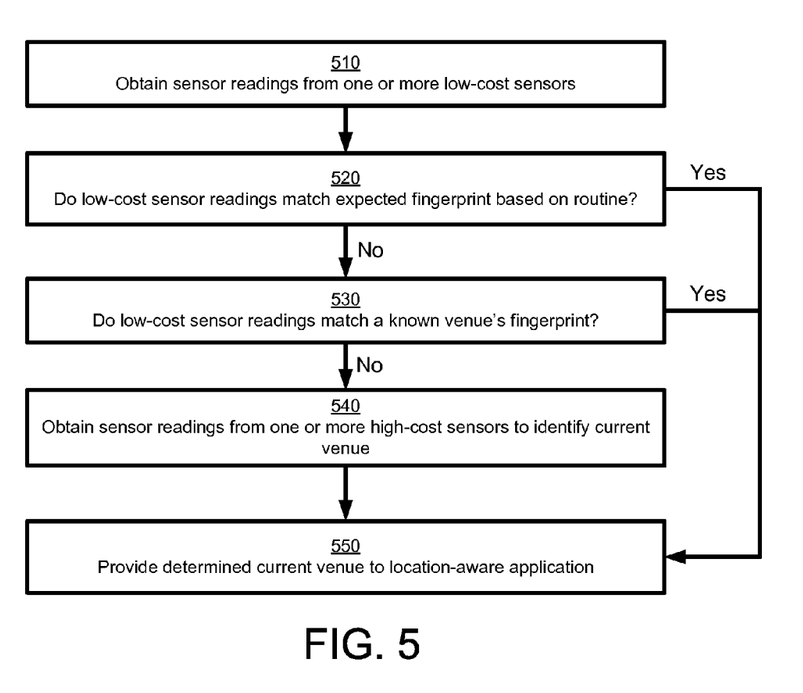
FIG. 5 is a flow chart illustrating a method of efficiently managing sensor use by a mobile device, according to one embodiment.

FIG. 5 illustrates a method of efficiently using the sensors 110 of a mobile device 100 to determine a current venue in which the device is located, according to one embodiment. The steps of FIG. 5 are illustrated from the perspective of various components of the sensor manger 125 performing the method. However, some or all of the steps may be performed by other entities and/or components. In addition, some embodiments may perform the steps in parallel, perform the steps in different orders, or perform different steps.

In the embodiment illustrated in FIG. 5, the method begins at 510 with the sensor manager 160 receiving readings from one or more low-cost sensors. In one embodiment, the low-cost sensors are those that use a small amount of battery power (e.g., camera 112, microphone 113, and accelerometer 114) as compared to a GPS location sensor 111. In other embodiments, other costs such as required bandwidth, required storage, and user disruption are used to determine which of the sensors 110 are low-cost sensors.

In step 520, the routine analysis module 166 identifies a venue the mobile device 100 is expected to be at based on the corresponding user's routine model. The fingerprint comparison module 164 compares the readings from the low-cost sensors to a fingerprint of that venue (e.g., a fingerprint previously generated by the mobile device and stored in local storage 168). If the readings from the low-cost sensors match typical sensor readings indicated by the sensor fingerprint within a pre-determined tolerance (e.g., the measure of sensor variability), the mobile device 100 is determined to be at the expected venue and the method proceeds to step 550. In one embodiment, the low-cost sensor readings are determined to match the expected venue fingerprint if each reading is within a threshold percentage (e.g., 5%) of the value included in the fingerprint. Alternatively or additionally to using a threshold percentage, the routine analysis module 166 determines whether the sensor reading is a range based on a measure of sensor variability indicated by the fingerprint. In other embodiments, other methods of determining a match are used. In other embodiments, the mobile device 100 uses the user's routine and/or low-cost sensor readings to determine a current location and a corresponding level of uncertainty. For example, if the sensor readings are a good match for the fingerprint of a venue the user is predicted to be at (based on the user's routine) then the level of uncertainty is low. However, if the sensor readings do not match the predicted venue but are a good match for another known venue, the level of uncertainty will be medium, while if the sensor readings are not a good match for any known venue, the level of uncertainty will be high. If the uncertainty crosses a threshold value, then the mobile device 100 turns on one or more high-cost sensors to more accurately determine the user's location. By altering the threshold, the system can be tuned to provide a desired balance between accuracy and cost reduction.

If the low-cost sensor readings do not match the expected venue fingerprint, the method proceeds to step 530, where the fingerprint comparison module 164 compares the low-cost sensor readings to the fingerprints of additional known venues. In one embodiment, the low-cost sensor readings are compared to all venue fingerprints that are available in local storage 168. If one of the stored venue fingerprints matches the low-cost sensor readings within a threshold tolerance, that venue is selected as the current venue. If more than one fingerprint matches, the fingerprint comparison module 164 selects one of them as the current venue, for example, by selecting the fingerprint that is the closest match, by presenting all of the matching fingerprints to the user for manual selection, by picking one of the matching fingerprints at random, and the like. In another embodiment, the fingerprint comparison module 164 compares the low-cost sensor reading to all fingerprints stored in remote centralized fingerprint storage 150 and selects a match as the current venue.

If the fingerprint comparison module 164 identifies the current venue by matching the low-cost sensor readings to an existing fingerprint, the method proceeds to step 550, where the current venue is passed to one or more location-aware applications 115. If the fingerprint comparison module 164 fails to identify a fingerprint that matches the low-cost sensor reading, the method proceeds to step 540.

In step 540, the sensor manager 160 receives readings from one or more high-cost sensors. In one embodiment, the high-cost sensors include a GPS location sensor 111. The GPS location sensor 111 provides a geo-spatial location for the mobile device 100 that is often accurate within a tolerance of the order of a few meters. Thus, the GPS location sensor 111 provides highly accurate location data at the cost of significant use of battery power. The geo-spatial location of the mobile device 100 is compared to a database of venues, stored either in local storage 168 or remotely (not shown), in order to identify the current venue. In some instances, the low-cost sensor reading may be used to assist in distinguishing between two or more venues that are in close proximity, and thus cannot be unambiguously separated by GPS alone. For example, if the GPS location indicates the mobile device 100 is either in the corresponding user's office (where the air conditioning system is typically set to 68 degrees) or the user's manager's office next door (where the air conditioning system is typically turned off), readings from the thermometer 115 can be used to differentiate between the two. As another example, if the GPS location narrows down the possible venues to a library or a coffee shop, the volume recorded by the microphone 113 will likely be sufficient to determine which venue the mobile device 100 is located within. As described previously, in other embodiments, cost factors other than battery usage are used to determine which sensors are high-cost sensors, and thus sensors other than the GPS location sensor 111 may be used as the high-cost sensor(s).

Once the method reaches step 550, the sensor manager 160 has identified a current venue at which the mobile device 100 is located, regardless of the particular route through the flowchart that is taken. The identified current venue is passed to one or more location-aware applications 115 to enable these applications to provide location-aware functionality to the user.

Additional Configuration Considerations

A computer is adapted to execute computer program modules for providing the functionality described herein. As used herein, the term "module" refers to computer program logic utilized to provide the specified functionality. Thus, a module can be implemented in hardware, firmware, and/or software. In one embodiment, program modules are stored on a storage device, loaded into memory, and executed by a processor.

Embodiments of the physical components described herein can include other and/or different modules than the ones described here. In addition, the functionality attributed to the modules can be performed by other or different modules in other embodiments. Moreover, this description occasionally omits the term "module" for purposes of clarity and convenience.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer-readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any other type of computer-readable storage medium suitable for storing electronic instructions, and coupled to a computer system bus. Furthermore, the computers referred to in the specification may include a single processor or may be architectures employing multiple processor designs for increased computing capability.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope of the invention.

What is claimed is:

1. A method for determining a venue of a mobile device, the method comprising:
    obtaining a physical sensor reading collected by a physical sensor of a mobile device, the physical sensor reading quantifying a physical property of an environment around the mobile device, the physical sensor including at least one of: a camera, a microphone, a thermometer, and a barometer;
    identifying a candidate venue at which the mobile device may be located without obtaining a location reading collected by a location sensor of the mobile device, the candidate venue having a stationary location, wherein identifying the candidate venue comprises identifying the candidate venue based on a routine model predicting venues for the mobile device based on a current time;
    retrieving, from a fingerprint database, a sensor fingerprint comprising an average physical sensor reading at the candidate venue;
    comparing the physical sensor reading to the average physical sensor reading of the retrieved sensor fingerprint;
    determining a location of the mobile device from the candidate venue responsive to the comparison indicating that the physical sensor reading is within a threshold amount of the average physical sensor reading; and
    providing the determined location of the mobile device to a location-aware application of the mobile device.

2. The method of claim 1, wherein determining the location of the mobile device comprises:
    responsive to determining that the physical sensor reading is not within the threshold amount of the average physical sensor reading, obtaining a location sensor reading from the location sensor of the mobile device;
    identifying a plurality of alternative candidate venues matching the location sensor reading; and
    determining the location of the mobile device by selecting one of the alternative candidate venues based on the physical sensor reading.

3. The method of claim 2, wherein determining the location of the mobile device comprises:
    comparing the physical sensor reading to average physical sensor readings at each of the alternative candidate venues, the average physical sensor readings retrieved from the fingerprint database; and
    selecting the one of the alternative candidate venues responsive to a corresponding average physical sensor reading at the selected alternative candidate venue having a closest match to the physical sensor reading.

4. The method of claim 1, wherein identifying the candidate venue further comprises:
    obtaining a geographical location of the mobile device at a previous time before a current time; and
    responsive to physical sensor readings indicating the mobile device has been stationary between the previous time and the current time, identifying the candidate venue within a threshold distance of the geographical location.

5. The method of claim 1, wherein determining the location of the mobile device comprises:
    obtaining, from the candidate sensor fingerprint, a measure of sensor reading variability specific to the physical sensor; and
    determining the location from the candidate venue responsive to determining that the physical sensor reading is within the measure of sensor reading variability from the average physical sensor reading for the candidate venue.

6. The method of claim 1, wherein the average physical sensor reading is based on an aggregated sensor reading determined from physical sensor readings at venues included in a venue category of the candidate venue.

7. A system for determining a venue of a mobile device, the system comprising:
    a processor;
    a non-transitory, computer-readable medium comprising instructions executable by the processor, the instructions comprising instructions for:
    obtaining a physical sensor reading collected by a physical sensor of a mobile device, the physical sensor reading quantifying a physical property of an environment around the mobile device, the physical sensor including at least one of: a camera, a microphone, a thermometer, and a barometer;
    identifying a candidate venue at which the mobile device may be located without obtaining a location reading collected by a location sensor of the mobile device, the candidate venue having a stationary location, wherein identifying the candidate venue comprises identifying the candidate venue based on a routine model predicting venues for the mobile device based on a current time;
    retrieving, from a fingerprint database, a sensor fingerprint comprising an average physical sensor reading at the candidate venue;
    comparing the physical sensor reading to the average physical sensor reading of the retrieved sensor fingerprint;
    determining a location of the mobile device from the candidate venue responsive to the comparison indicating that the physical sensor reading is within a threshold amount of the average physical sensor reading; and
    providing the determined location of the mobile device to a location-aware application of the mobile device.

8. The system of claim 7, wherein determining the location of the mobile device comprises:
    responsive to determining that the physical sensor reading is not within the threshold amount of the average physical sensor reading, obtaining a location sensor reading from the location sensor of the mobile device;
    identifying a plurality of alternative candidate venues matching the location sensor reading; and
    determining the location of the mobile device by selecting one of the alternative candidate venues based on the physical sensor reading.

9. The system of claim 8, wherein determining the venue of the mobile device comprises:
- comparing the physical sensor reading to average physical sensor readings at each of the alternative candidate venues, the average physical sensor readings retrieved from the fingerprint database; and
- selecting the one of the alternative candidate venues responsive to a corresponding average physical sensor reading at the selected alternative candidate venue having a closest match to the physical sensor reading.

10. The system of claim 7, wherein identifying the candidate venue further comprises:
- obtaining a geographical location of the mobile device at a previous time before a current time; and
- responsive to physical sensor readings indicating the mobile device has been stationary between the previous time and the current time, identifying the candidate venue within a threshold distance of the geographical location.

11. The system of claim 7, wherein determining the location of the mobile device comprises:
- obtaining, from the candidate sensor fingerprint, a measure of sensor reading variability specific to the physical sensor; and
- determining the location from the candidate venue responsive to determining that the physical sensor reading is within the measure of sensor reading variability from the average physical sensor reading for the candidate venue.

12. The system of claim 7, wherein the average physical sensor reading is based on an aggregated sensor reading determined from physical sensor readings at venues included in a venue category of the candidate venue.

13. A non-transitory, computer-readable medium comprising instructions executable by a processor, the instructions comprising instructions for:
- obtaining a physical sensor reading collected by a physical sensor of a mobile device, the physical sensor reading quantifying a physical property of an environment around the mobile device, the physical sensor including at least one of: a camera, a microphone, a thermometer, and a barometer;
- identifying a candidate venue at which the mobile device may be located without obtaining a location reading collected by a location sensor of the mobile device, the candidate venue having a stationary location, wherein identifying the candidate venue comprises identifying the candidate venue based on a routine model predicting venues for the mobile device based on a current time;
- retrieving, from a fingerprint database, a sensor fingerprint comprising an average physical sensor reading at the candidate venue;
- comparing the physical sensor reading to the average physical sensor reading of the retrieved sensor fingerprint;
- determining a location of the mobile device from the candidate venue responsive to the comparison indicating that the physical sensor reading is within a threshold amount of the average physical sensor reading; and
- providing the determined location of the mobile device to a location-aware application of the mobile device.

14. The computer-readable medium of claim 13, wherein determining the location of the mobile device comprises:
- responsive to determining that the physical sensor reading is not within the threshold amount of the average physical sensor reading, obtaining a location sensor reading from the location sensor of the mobile device;
- identifying a plurality of alternative candidate venues matching the location sensor reading; and
- determining the location of the mobile device by selecting one of the alternative candidate venues based on the physical sensor reading.

15. The computer-readable medium of claim 14, wherein determining the location of the mobile device comprises:
- comparing the physical sensor reading to average physical sensor readings at each of the alternative candidate venues, the average physical sensor readings retrieved from the fingerprint database; and
- selecting the one of the alternative candidate venues responsive to a corresponding average physical sensor reading at the selected alternative candidate venue having a closest match to the physical sensor reading.

16. The computer-readable medium of claim 13, wherein identifying the candidate venue further comprises:
- obtaining a geographical location of the mobile device at a previous time before a current time; and
- responsive to physical sensor readings indicating the mobile device has been stationary between the previous time and the current time, identifying the candidate venue within a threshold distance of the geographical location.

17. The computer-readable medium of claim 13, wherein determining the location of the mobile device comprises:
- obtaining, from the candidate sensor fingerprint, a measure of sensor reading variability specific to the physical sensor; and
- determining the location from the candidate venue responsive to determining that the physical sensor reading is within the measure of sensor reading variability from the average physical sensor reading for the candidate venue.

\* \* \* \* \*